UNITED STATES PATENT OFFICE.

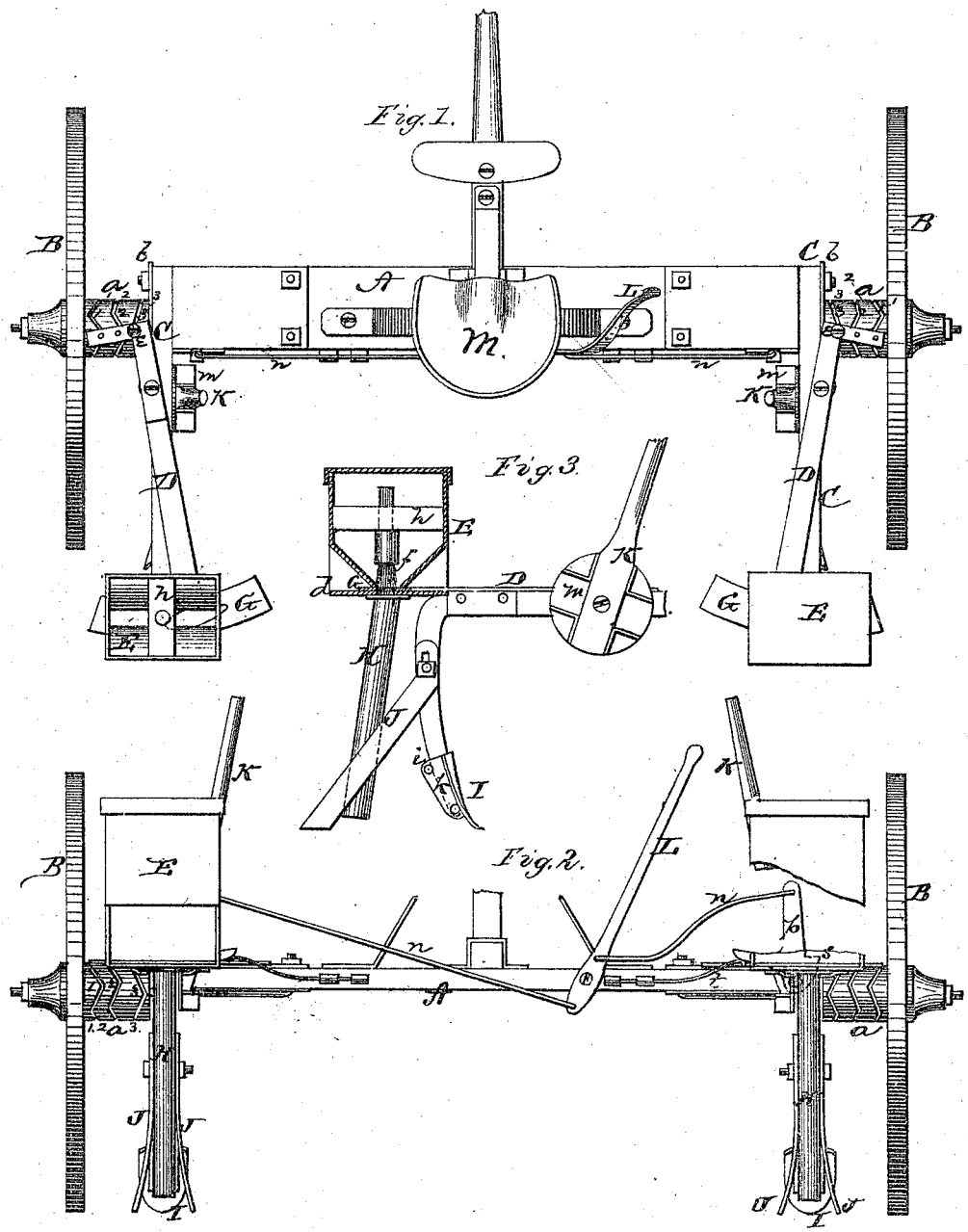

WILLIAM J. C. CRANDALL, OF STEEL'S, INDIANA.

IMPROVEMENT IN CORN-PLANTERS.

Specification forming part of Letters Patent No. 134,521, dated January 7, 1873.

*To all whom it may concern:*

Be it known that I, W. J. C. CRANDALL, of Steel's, in the county of Rush and State of Indiana, have invented certain new and useful Improvements in Corn-Drills; and I do hereby declare that the following is a full, clear, and exact description thereof, reference being had to the accompanying drawing and to the letters of reference marked thereon which form a part of this specification.

The nature of my invention consists in the construction and arrangement of a double corn-drill, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a rear elevation, of my entire machine; Fig. 3 is a side view of one of the plow-beams with attachments, the corn-box being in vertical section.

A represents the axle-board, of any suitable dimensions, provided at each end near the rear side with a spindle, upon which the wheel B is placed. At or near the front side on each end of the axle A is a rod or shaft, upon the end of which the plow-beam C is pivoted. The ends of the axle A are lined with metal, and a metal plate, $b$, connects the beam-pivot with the spindle, forming a space in which the beam C is placed, as shown. On the upper side of each plow-beam C is pivoted an L-shaped lever, D, one arm of which extends over the hub $a$ of the wheel. This hub is provided with three circumferential grooves, marked, respectively, 1, 2, and 3, each groove running in zigzag form, as shown. These grooves are so arranged as to drop the corn three different distances, by moving a screw, $e$, in the lever D, from one groove to the other. If the wheels are ninety-six inches in circumference the hub $a$ should be about fifteen inches in circumference and eight inches long, the groove 1 next to the spokes, when the screw $e$ in the same will cause the lever D to make eight strokes for each revolution of the wheel, and hence drop corn every twelve inches. The second groove, 2, causes the lever to make six strokes, and hence drop corn every sixteen inches; and the groove 3 causes the lever to make four strokes, and thus drop corn every twenty-four inches. E E represent the hoppers, which are to be made of sheet-iron of any desired dimensions, and fastened to a bottom plate, $d$, at each corner, as shown. This plate is to be fastened to the rear end of the plow-beam C by bolts or other suitable means. The corn-dropping or working plate G, which moves on the bottom plate $d$, is to be of segmental form, as shown, and attached to the rear end of the lever D. The aperture in the plate $d$ is to be round and about one inch in diameter, while the aperture in the working-plate G is to be about an inch and a half long, and about half an inch wide at the ends, and largest in the middle. In the center of each box E is a brush, $f$, screwed into a cross-bar, $h$, permanently fastened in the box, so that the brush may be raised or lowered at will to allow more or less corn to be dropped at each stroke. The corn passes through the conductors H H, which are attached to the under sides of the bottom plates $d\ d$, and the corn is deposited in the furrow immediately behind the plows I. Each plow is riveted to a casting, $k$, and this casting pivoted at its lower end to the lower end of the plow-beam C, while a wooden pin, $i$, passing through the casting behind the plow-beam holds the plow in proper position. Should, however, either plow strike any solid obstruction, this wooden pin will break and allow the plow to turn, preventing any injury to the machine. In rear of the conductor H work two thin cutters, or coverers, J J, to cover the corn; they are connected at their upper ends, as shown, (or they may be disconnected,) and attached by a single bolt or screw to the plow-beam, said bolt or screw passing through slots in the covers, so that they can be adjusted at will to cover deep or shallow, as desired. On the inner side of each plow-beam is attached a casting, $m$, in which a handle, K, is inserted. These handles may be inserted from above, as shown, so that the driver from his seat M, which is supported on the axle A, can raise either plow out of the ground; or the handles may be inserted from underneath, so that he can perform the same while walking behind and between them. On the rear side of the axle A is pivoted a lever, L, which, by rods $n\ n$, is connected with small L-shaped levers *p p*, pivoted one at each end on the rear side of the axle. Each of these levers *p* is on its outer side provided with a tooth or projection, *s;* and a spring, *t*, is so arranged under said lever that when either plow-beam is raised, the spring will turn the corresponding lever till the tooth *s* comes under and supports the beam. It will be noticed that by the raising of the plow-beam the movement of the dropping mechanism is stopped, because the screw *e* becomes thereby raised out of its groove on the hub *a*. By pulling the lever L to one side the hooks or teeth *s s* are withdrawn from the plow-beams, and they will fall down again, throwing the dropping mechanism in gear.

Having thus fully described my invention, what I claim as new, and desire to secure by Letters Patent, is—

1. The driving-wheel hub *a* provided with circumferential zigzag grooves 1, 2, and 3, in combination with the L-shaped lever D and screw *e*, or their equivalents, for operating the dropping mechanism, substantially as herein set forth.

2. The casting *m*, constructed with the two seats for the lever K, when used in connection with the mechanism of the seed-dropping device, substantially as set forth.

In testimony that I claim the foregoing as my own I affix my signature in presence of two witnesses.

WILLIAM J. C. CRANDALL.

Witnesses:
 W. W. THRASKER,
 WILLIAM A. BUSH.